March 29, 1955  E. P. ARTHUR  2,705,220
ELECTRO-CHEMICAL APPARATUS
Filed Jan. 23, 1951
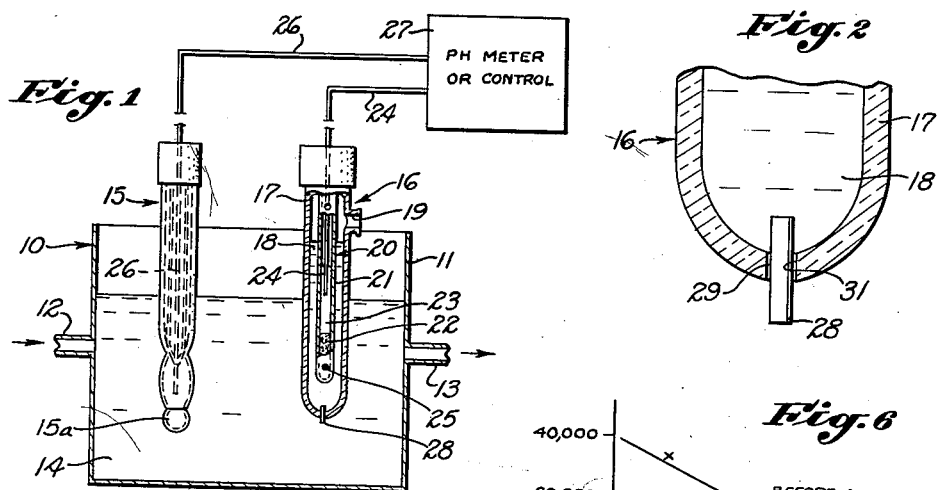
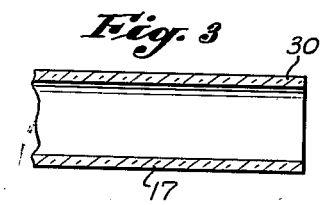
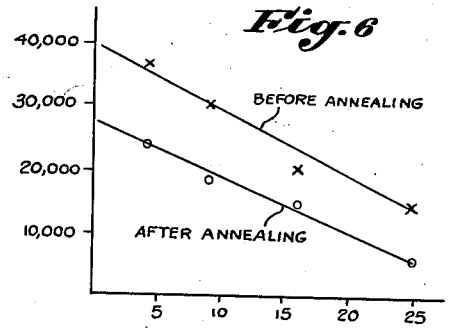
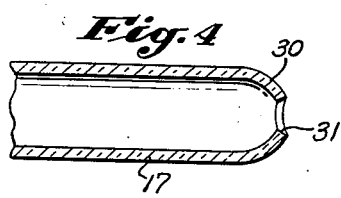
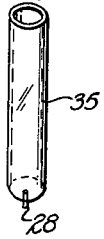
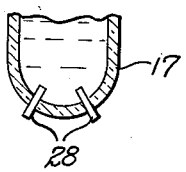
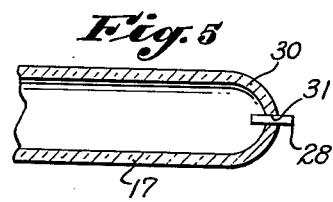
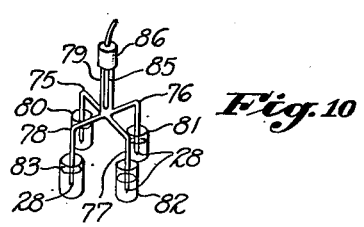
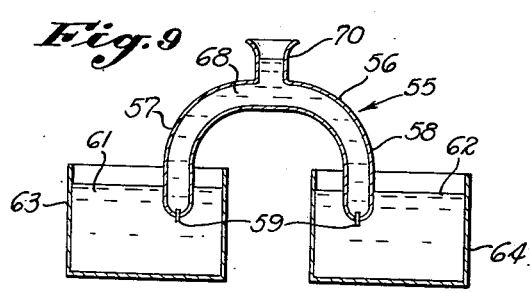
INVENTOR:
EDWIN P. ARTHUR
BY HIS ATTORNEYS
HARRIS, KIECH, FOSTER & HARRIS

United States Patent Office 2,705,220
Patented Mar. 29, 1955

2,705,220

ELECTRO-CHEMICAL APPARATUS

Edwin P. Arthur, Altadena, Calif., assignor to Beckman Instruments, Inc., South Pasadena, Calif., a corporation of California Application January 23, 1951, Serial No. 207,416

7 Claims. (Cl. 204—195)

My invention relates to the production of minute passages between spaced zones and will be exemplified with reference to electrochemical measurements and controls and as applied to a novel liquid-junction-forming element applicable to salt bridges as used with reference electrodes and the like. However, those skilled in the art will recognize its usefulness in other instances where minute leak-passages are desirable to permit minute flows of fluids (gases or liquids) from one zone to another, as in devices employing vacuum systems of which the mass spectrophotometer may be cited as an example.

It is a general object of the invention to provide a novel leak structure between spaced zones permitting a controlled flow of a fluid from one zone to another in response to a pressure difference between the zones.

In electrochemical measurements a reference electrode is commonly employed in conjunction with a measuring electrode, for example, a glass electrode, both being immersed in a test solution, the potential between the two electrodes being a function of the concentration of a specific ion or ions, for example, the concentration of hydrogen or hydroxyl ion in the solution. Such an arrangement forms the basis of the so-called pH meter which is widely used for evaluation and control of pH of static or flowing solutions.

The reference electrode usually comprises an internal half-cell structure supported within a tube containing a salt solution. The tube of salt solution is characterized as a "salt bridge," i. e., it forms an electrical bridge between the half-cell and the sample or test solution. Electrical connection between the salt solution and the sample or test solution is made by liquid contact via a suitably formed aperture or passage in the salt-containing tube. At times the entire unit consisting of the internal half-cell structure, the tube, the salt solution, and the liquid-junction-forming means is referred to as a "half-cell," but the present invention can best be exemplified by using the more accurate terminology outlined above.

Various means have been proposed for forming the liquid junction, including agar-gel connections, wicking, fibers, a small-bore tube, and even a glass tube with cracks in it. The liquid junction behavior must be substantially independent of the character of the test solution and must give substantially reproducible potentials. Commonly the liquid junction is continuously renewed by flowing the salt solution as a small stream into the test solution to establish an interfacial or liquid-junction zone. Prior proposals have been open to objections such as slow and costly methods required for fabrication or excessive flow of salt solution, insufficient velocity to prevent infiltration of the test solution or to wash the contaminating substances away, sluggish equilibrium when transferring the electrode structure from one solution to another of different character, and instability and non-reproducibility of results due to the ill-defined or diffusive nature of the junction zone.

Another object is to produce a liquid junction which is subject to little or no thermal degeneration and no infiltration or poisoning by adsorption of matter from the media being tested.

A further object is to provide a liquid-junction-forming means which exhibits little or no hysteresis when subject to rapidly changing media of wide chemical variability. A further object is to provide such a means characterized by extreme rapidity of equilibration when changing from one solution to another of different character.

A further object of the invention is to provide a method and apparatus by which a liquid-junction-forming element may be easily manufactured to desired specifications of electrical resistance or rate of outflow of electrolyte and with substantial physical strength due to the flawless molded structure involved.

Generally speaking, my invention involves a new way of molding an extremely minute space or passage in the wall of a leak structure or a water-impermeable salt bridge tube or member, the passage being of such size as to restrict the flow of salt solution therethrough to an acceptably small value while permitting utilization of the minute stream as an ionic path. With the extremely small passages made possible by the present invention, a relatively high velocity of the salt solution can be obtained even with a low pressure differential and with a small gross volume of solution flowing through the passage per unit time.

The invention involves the forming of a minute passage or annulus adjacent a metal mandrel which extends completely through a wall of water-impermeable material, usually glass. The mandrel is formed of an inert metal such as platinum, tantalum or palladium. The metal mandrel should have a coefficient of thermal expansion greater than that of the surrounding wall material so that upon cooling of the mandrel and surrounding material the aforesaid minute passage or annulus will be formed, the mandrel being supported by the surrounding material and being left in place during use. In practice it is found that the narrowness of the annular passage, combined with microscopic imperfections in the geometry of the mandrel, serves to secure the latter firmly and reliably. It is an important object of the invention to employ such a mandrel in producing such a minute annular passage.

In the light of ordinary understandings and practices in the electrochemical art, it is highly unexpected that a metal mandrel with its ends respectively contacting the salt solution and the test solution would permit successful operation in such electrochemical apparatus. It is well known that when an inert metal such as platinum or palladium is immersed in a solution containing oxidizing or reducing substances, it assumes some definite potential with respect to such solution, depending upon the composition thereof. Indeed, a platinum electrode is used in such solutions and in conjunction with a reference electrode to arrive at the so-called "oxidation-reduction potential" of the solution. It might be expected, therefore, that the use of a platinum mandrel would introduce a variable potential with respect to the test solution in the present invention and that, being in electrical contact with the salt solution, it would produce large and variable differences across the junction between the interior and exterior solutions to vitiate the usefulness. This is particularly true remembering that a reference electrode is useful only if it has a fixed potential with respect to any solution in which it may be placed regardless of solution composition and remembering that such reference electrodes are often placed in oxidizing or reducing substances. In general, placement of any metal element such as a platinum or palladium mandrel at the reference-electrode liquid junction, precisely at the point where negligible potential differences should exist, would be judged ruinous of acceptable results.

For example, if side-by-side vessels each respectively containing solutions forming oxidizing or reducing systems are interconnected by a tubular salt bridge and if a wire of inert metal is immersed in each vessel, these wires will assume a potential with respect to their solutions dependent upon the nature of the oxidation-reduction system in the respective vessels, the concentrations of the solutions and the temperature thereof. If these assumed potentials are different, current will flow through any conducting member connecting the two wires. Each such vessel may be considered as a half-cell.

Superficially, the present invention might appear to be analogous to the above, the internal and external solutions being electrically joined by the mandrel and the minute passage forming a salt bridge. Also, it might be expected that a small current would flow through the mandrel to destroy the efficacy of the device as a reference electrode. Thus, it might be expected that the mandrel, the minute passage and the two bodies of solution would form a complete electrical circuit and that the internal and external solutions, each having a different potential with respect to the mandrel, would show a difference of potential with respect to each other.

But tests have shown that these expectable results are not encountered, e. g., that there is essentially no difference of potential of the solutions with respect to each other. The inner solution is usually a solution of a salt such as potassium chloride with respect to which the mandrel will not establish any definite equilibrium potential. Expressed differently, there is no available mechanism by which electron transfer into or out of the mandrel at its internal end is made possible, such as is necessary if electrical, essentially thermodynamic, equilibrium is to exist. However, at the outer end of the mandrel the presence of an oxidant or a reductant can provide such a transfer mechanism and condition of equilibrium. In the absence of equilibrium at the inner end of the mandrel, however, there is an incomplete circuit with a net result that the potential difference between the internal salt solution and the test solution is indifferent to the presence of the mandrel, having only incidental values characteristic of a liquid junction having no mandrel in the stream.

If one wishes to consider the phenomenon from another point of view, one acknowledges that a mechanism for electron transfer, however slender, is in fact always provided at the inner end of the mandrel. This occurs to the extent that at least a minute amount of dissolved oxygen, resulting from atmospheric absorption, will always be present in the salt solution, wherefore the following reaction may be postulated:

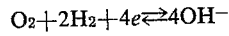

If the reaction proceeds to the right, the wire yields electrons to the solution. If the reaction proceeds to the left, the wire acquires electrons from the solution. The direction in which the reaction proceeds would depend upon the relative potential of the companion "half-cell," i. e., the outer end of the mandrel extending in the sample or test solution. For example, if the latter were more positive (or less negative) than the inner "half-cell" potential characteristic of the above reaction, electrons would flow from the inner to the outer end of the mandrel and the reaction would proceed to the left. If the outer "half-cell" potential were less positive (or more negative), the reaction would proceed to the right.

As it happens, the reaction of the above equation can proceed in neither direction to any extent sufficient to establish a true condition of equilibrium. If the reaction were to proceed to the right, the minute amount of available molecular oxygen would immediately be exhausted. If the reaction were to proceed to the left, only a minute concentration of $OH^-$ ion ($10^{-7}$ moles/liter) would be available, in neutral solution. Even if $OH^-$ were abundantly available in the latter case, molecular oxygen would be deposited on the mandrel surface. In all of these situations, effective attainment of a normal equilibrium condition is blocked or, expressed differently, polarization may be said to occur. When such a condition is established (effectively instantaneously), the mandrel ceases to be active as an electrical element in the liquid junction, and again the potential difference between inner and outer solutions becomes indifferent to the presence of the metal mandrel.

It is desirable, however, that the internal solution should not contain an oxidant or reductant, e. g., that the presence of a redox solution is to be avoided. In practice, any contamination of the internal solution from the external solution by migration of contaminants via the liquid junction is prevented by the constant minute outflow of the salt solution.

Certain embodiments of the invention are illustrated in the appended drawing in which:

Fig. 1 is a diagrammatic view of an electrochemical cell employing a reference electrode incorporating the invention;

Fig. 2 is an enlarged sectional view of the lower end of the reference electrode assembly, showing the invention greatly exaggerated in size and distorted in scale;

Figs. 3–5 are diagrammatic views illustrating one method of producing the invention;

Fig. 6 is a graphical representation showing the variation between resistance and passage size before and after annealing and with mandrels of various size;

Fig. 7 is a perspective view of a simple tube incorporating the invention;

Fig. 8 is an enlarged fragmentary sectional view showing the lower end of a tube providing two liquid junctions;

Fig. 9 is a diagrammatic view illustrating the invention as applied to a salt bridge of novel construction; and Fig. 10 is a perspective view showing the invention applied to an electrochemical apparatus for testing several solutions.

Referring particularly to Fig. 1, the invention is shown as associated with an electrochemical cell 10 including a container 11 through which a sample or test solution flows from an inlet 12 to an outlet 13, producing a body 14 of such test solution. Submerged in this body is a conventional measuring electrode, shown as a glass electrode 15, and a reference electrode 16 incorporating the invention. The particular glass electrode 15 shown is not per se a part of the present invention, being shown as a commercial type having a pH-sensitive bulb 15a. The electrodes 15 and 16 are supported in the container 11 by any conventional means.

The reference electrode 16 is shown as including a tube 17 comprising the liquid-junction-forming element and containing a body 18 of a filling solution, usually a salt solution such as saturated potassium chloride, which can be inserted through a filling opening 19. Extending into the body 18 is a conventional half-cell 20 of any well-known type such as a mercury-calomel half-cell, shown as including a tube 21 having a mass of glass wool 22 in its lower end with a body 23 of a mercury-calomel mixture thereabove into which a conductor 24 extends. An opening 25 is formed in the tube 21 to give ionic communication between the interior and the body of salt solution 18. With this arrangement, a potential difference will appear between a conductor 26, connected to the glass electrode 15, and the conductor 24, the magnitude of this potential being a function of hydrogen ion concentration or the hydroxyl ion concentration of the body of the test solution 14. This difference in potential can be used to actuate a pH meter or a pH control mechanism 27.

To produce a liquid junction between the body of salt solution and the body of test solution 14, the invention employs a small metal mandrel 28 extending completely through the tube 17 and having at its periphery a minute space or passage 29, illustrated greatly exaggerated in size in Fig. 2.

The salt solution within the tube 17 is preferably under slightly higher pressure than the external solution so that a minute but definite flow of the salt solution takes place through the passage 29 into the test solution to produce a continuously-renewed liquid junction at the point where the flowing salt solution contacts the test solution. This slight difference in internal and external pressure can be obtained merely by maintaining the level of the internal body of salt solution 18 a few centimeters above the level of the body of test solution 14. Such a small pressure differential is sufficient to cause flow of the minute stream through the passage 29 at comparatively high velocity, this velocity being sufficient to flush from the passage any contaminating substances. Also, the passage 29 is so minute in cross-sectional area that the loss of salt solution is for practical purposes insignificant, permitting as little as a minute fraction of a milliliter per day to flow under a liquid head of about two centimeters. The comparatively high velocity also prevents any diffusion of the external media, typically the test solution, into the inside of the tube 17, thereby preventing the formation of unduly large or unstable liquid-junction potentials and rendering the reference electrode voltage independent of the external media, as previously explained.

The tube 17 should be formed of a water-impermeable material. While certain plastic materials can be satisfactorily employed, I prefer to form this tube of glass, preferably a borosilicate glass. The mandrel 28 may be formed of any inert metal such as platinum or palladium. The materials of the tube and mandrel should have different thermal coefficients of expansion, the mandrel material preferably having the higher coefficient. Excellent results will be produced by using a borosilicate glass (coefficient=approx. $0.055 \times 10^{-4}$) and platinum (coefficient=approx. $0.088 \times 10^{-4}$).

Figs. 3–5 illustrate one method of molding a platinum mandrel 28 in place in a glass tube 17. The glass tube, initially as shaped in Fig. 3, is heated at its end 30 to draw this end inwardly and provide an opening 31 somewhat larger than the mandrel 28, this intermediate shape being suggested in Fig. 4. The mandrel 28 is then placed in the opening 31 and the glass of the end 30 is molded around this mandrel. The surface tension of the glass combined with appropriate manipulation serve to bring the hot glass into smooth, superficial contact with the surface of the mandrel 28. The manipulation of the mandrel is so controlled during the sealing operation, by longitudinal adjustment, as to yield a contact angle between the glass and the mandrel which is approximately 90°.

While the aforesaid practices illustrate one method of molding of the glass about the mandrel 28, the invention includes also any other method of molding the mandrel in place such as by casting or spinning.

At the end of the molding operation the mandrel and surrounding glass will be of approximately the same temperature. However, on cooling to room temperature the mandrel shrinks more than the glass, leaving the minute passage 29 as an annulus, albeit the glass still supports the mandrel due to superficial contact, microscopic surface irregularities, etc. The metal mandrel cools more rapidly than the glass, partly because of the exposed end portions of the former, and will locally chill and strain the glass layer adjacent to it. During subsequent slow cooling, the mandrel shrinks minutely away from the adjacent glass to open the annulus. Subsequent annealing of the glass at the junction, as by reheating the glass to annealing temperature, will minutely further enlarge the annulus in the course of relieving the strain in the layer adjacent to the mandrel.

The actual size of the annulus is so small that little or no superficial evidence of it can be appreciated except by measurement of the electrical resistance of a salt solution which extends in it as an attenuated film. Sometimes if the tube is filled with salt solution and exposed to the air, a small deposit of salt crystals will gradually accumulate to betray the minute flow of salt solution through the passage around the mandrel.

The flow rate through the minute passage can be varied by proper selection of materials as to thermal coefficients, by annealing, or by increasing the number of mandrels, as by using a plurality of these at different positions relative to the tube 17. The effects of annealing and typical size and resistance values are shown in the Table I and Fig. 6 where resistances R of the annular passage when filled with a potassium chloride solution were measured when employing platinum mandrels of various diameter D. $D^2$, the square of the diameter, is proportional to the cross-sectional area of the annulus and the data in Table I, plotted in Fig. 6, show good agreement between experimental facts and theoretical mathematics of the system. It will be immediately recognized from the quantitative results of Table I that the invention provides a high measure of predictability and control in annulus dimensions and resistance characteristics.

Table I

| D (in thousandths of an inch) | $D^2$ | Resistance (ohms) Before Annealing | Resistance (ohms) After Annealing |
| --- | --- | --- | --- |
| 20 | 400 | 36,000 | 24,000 |
| 30 | 900 | 30,000 | 19,000 |
| 40 | 1,600 | 20,000 | 15,000 |
| 50 | 2,500 | 15,000 | 6,500 |

To illustrate the efficiency of the invention and its quick response and absence of hysteresis effects when shifted from media to media, Table II presents a series of pH measurements made in rapid succession with only sufficient intervening time to perform the steps mentioned under "Remarks." These data were obtained by conventional commercial equipment including a glass electrode, a pH meter and a calomel-mercury half-cell with the liquid junction of the invention made with a platinum mandrel of a diameter of .008" and of a length about 2.5 mm., the junction structure having a resistance of 28,000 ohms when filled with potassium chloride solution at 23° C. Unaltered response upon addition of quinhydrone, constituting a redox system, to the test medium, in some of the steps shown, proves that the reference electrode, contrary to ordinary expectations, is unaffected by the presence of oxidants or reductants in the sample or test solution.

Table II

| Media | Meter Reading | Remarks |
| --- | --- | --- |
| pH 4 buffer | 4.00 | By adjustment at 23° C. |
| pH 7 buffer | 7.00 | After wiping with tissue paper only. |
| pH 10 buffer | 9.98 | Do. |
| same | 10.00 | One minute later. |
| same | 9.85 | After adding sufficient quinhydrone to alter the buffer. |
| pH 10 buffer | 9.85 | Actual pH change was caused by quinhydrone, as proved here by check with separate reference electrode having conventional junction. |
| pH 7 buffer | 7.00 | After wiping with tissue paper only. |
| same | 7.00 | After adding quinhydrone. |
| pH 4 buffer | 4.00 | After wiping with tissue paper only. |
| same | 4.00 | After adding quinhydrone. |

It will be apparent that the liquid junction is not easily contaminated. Even with only a tissue paper wipe, the junction comes to an immediate equilibrium with little or no drifting. Considered apart from inherent inertia of other elements of the equipment, the response of the reference electrode with my liquid junction was to all intents instant. That is, not more than a few seconds elapse following insertion in a medium before the meter makes equilibrium evident. Thus, while my invention does not eliminate drift which may have its origin in the thermionic tubes or pH-sensitive glass electrode, it renders measurement more certain by elimination of spurious errors due to heretofore-encountered liquid junction potentials.

In comparing my invention with other methods heretofore taught whereby the fracture of a glass wall can be made to serve as a liquid junction and salt bridge, it will at once be appreciated that I do not contemplate the development of cracks for functional efficiency. Cracks in glass are a source of fundamental weakness. Moreover, once initiated, the path of a crack may be unpredictable both as to locus and width. Practically, this means that the manufacture of cracked glass walls is a most uncertain matter. In contrast, my invention permits the production of a predictable annulus of sought characteristics. Furthermore, the smooth molded annulus made possible by my invention yields smooth steady flow of electrolyte and consequently steady reproducible potentials. Ease, rapidity and certainty of fabrication to specification add to the utility of my invention.

If an attempt is made to substitute a glass plug for the metal mandrel of the invention, the results will be greatly inferior. For example, if a globule of molten glass is disposed in a pre-formed opening of a hot glass wall, a crack will form upon cooling, if the glasses have different temperature coefficients. Such a crack represents a focal point of weakness in the resulting structure and is open to other objections. My present invention, compared to the glass plug or crack method, offers greatly enhanced control and predictability of electrical resistance characteristics and outflow rate, as shown by the results of Table I, since the dimensions and geometry of the annulus can be predetermined within narrow limits by choice of mandrel diameter and suitable selection of coefficients of expansion.

Fig. 7 shows the invention embodied in a tube 35 open at its upper end for connection in any desired relationship with other structures by means of rubber tubing or similar means. One of the mandrels 28 is molded in the end wall at the closed end of the tube 35. The minute annulus or passage around such a mandrel 28 can be used to establish a minute flow of fluid from a zone within the tube 35 to a zone outside the tube or vice versa. Such a tube is useful as a leak structure in conjunction with apparatus other than for making electrochemical measurements, being suited for any use in which a minute opening is desired or a minute flow of gases or liquids is to take place between spaced zones.

Fig. 8 illustrates how the tube 17 or the tube 35 can be modified to employ a plurality of the mandrels 28 at different positions. Such a structure provides alternate passages should one or more of these passages become inoperative for any reason such as becoming clogged with some viscous foreign substance. When this arrangement is used in conjunction with a reference electrode, the electrode resistance will be reduced because of the plurality of passages respectively around the mandrels 28.

Fig. 9 exemplifies the use of the invention in a salt bridge structure 55 including a tube means 56 with two closed legs 57 and 58, at least one of these being equipped with a mandrel 59 positioned as previously described. The legs 57 and 58 dip respectively into different solutions 61 and 62 in containers 63 and 64 which may, for example, respectively contain reference and measuring electrodes connected to any suitable potential-responsive system, as before. A salt solution 68 bridges the mandrels 59 and may be inserted into an open neck 70 which preferably flares upwardly and outwardly. In some installations, this neck may receive the reference electrode. The open neck 70 facilitates filling the tube means 56 with the salt solution to maintain a hydrostatic head applied to both legs 57 and 58. Such a salt bridge gives excellent liquid junctions because of the flow through the minute passages around the mandrels 59 and because of the other distinctive advantages pointed out above.

Fig. 10 shows an alternative structure in which a plurality of legs 75, 76, 77 and 78 extend outwardly and downwardly from a neck 79. The lower end of each leg carries one of the mandrels 28 and dips into one of a series of containers 80, 81, 82 and 83 which, for example, may contain different solutions. A single reference electrode 85 is supported by a cap 86 to extend downwardly in the neck 79. This neck and each of the legs 75—78 are filled with a salt solution. A single glass electrode, not shown, may be selectively inserted in the containers 80—83 and connected to pH metering or control equipment along with the reference electrode 85.

Various changes and modifications can be made without departing from the spirit of the invention as defined in the appended claims. Additionally, various specific uses for the invention, other than those described, will be apparent to those skilled in the art.

I claim as my invention:

1. In combination, a half-cell and a salt bridge tube for electrical connection between said half-cell and a test solution, said salt bridge tube comprising a non-conductive wall and a metal element extending through said wall and forming a minute passageway connecting opposite sides of said wall and providing a liquid junction.

2. In combination, a half-cell and a salt bridge tube for electrical connection between said half-cell and a test solution, said salt bridge tube comprising a non-conductive wall of a water impermeable material and an inert metal element extending through said wall and cooperating therewith in forming a minute passage around said element connecting opposite sides of said wall and providing a liquid junction.

3. A combination as defined in claim 2 in which said wall is formed of glass and in which said passage is a minute annular passage around said metal element.

4. A combination as defined in claim 2 in which the metal element is substantially cylindrical.

5. A combination as defined in claim 2 in which the metal element is of a length substantially greater than the thickness of said wall and provides end portions, at least one of said end portions protruding from a corresponding side of said wall.

6. In combination, a half-cell and a salt bridge tube for electrical connection between said half-cell and a test solution, said salt bridge tube comprising a glass wall and a metal element having minute surface irregularities, said metal element extending through said wall and cooperating with the glass thereof in forming a minute passage connecting opposite sides of said glass wall and providing a liquid junction, said metal element being retained in position by the glass of said wall engaging said minute surface irregularities.

7. In combination, a half-cell and a salt bridge member for electrical connection between said half-cell and a test solution, said salt bridge member comprising a glass wall and a mandrel formed of an inert metal extending through said wall and providing exposed end portions protruding from opposite sides of said wall, said metal mandrel being retained in position by the glass of said wall, there being a minute passage between said mandrel and such glass, said passage connecting opposite sides of said wall and providing a liquid junction.

References Cited in the file of this patent

UNITED STATES PATENTS

| | | |
|---|---|---|
| 1,999,525 | Morscholz | Apr. 30, 1935 |
| 2,298,974 | Shaw | Oct. 13, 1942 |
| 2,345,498 | Perley | Mar. 28, 1944 |
| 2,387,727 | Godshalk | Oct. 30, 1945 |
| 2,428,059 | Wolfson et al. | Sept. 30, 1947 |
| 2,451,663 | Coleman | Oct. 19, 1948 |